United States Patent
Kunisada

(10) Patent No.: US 9,533,726 B2
(45) Date of Patent: Jan. 3, 2017

(54) MOTORCYCLE FUEL TANK COVER

(71) Applicant: Kawasaki Jukogyo Kabushiki Kaisha, Hyogo (JP)

(72) Inventor: Youhei Kunisada, Kobe (JP)

(73) Assignee: KAWASAKI JUKOGYO KABUSHIKI KAISHA (JP)

( * ) Notice: Subject to any disclaimer, the term of this patent is extended or adjusted under 35 U.S.C. 154(b) by 0 days.

(21) Appl. No.: 14/724,688

(22) Filed: May 28, 2015

(65) Prior Publication Data
US 2015/0258888 A1 Sep. 17, 2015

Related U.S. Application Data

(63) Continuation of application No. PCT/JP2013/084039, filed on Dec. 19, 2013.

(30) Foreign Application Priority Data

Dec. 26, 2012 (JP) .................. 2012-282409

(51) Int. Cl.
*B62J 35/00* (2006.01)
*B60K 15/073* (2006.01)
*B60K 15/05* (2006.01)
*B60K 15/04* (2006.01)

(52) U.S. Cl.
CPC ............. *B62J 35/00* (2013.01); *B60K 15/05* (2013.01); *B60K 15/073* (2013.01); *B60K 2015/0432* (2013.01); *B60K 2015/0451* (2013.01); *B60K 2015/0487* (2013.01)

(58) Field of Classification Search
CPC ............. B60K 15/03; B60K 15/03006; B60K 15/0406; B60K 15/073; B60R 13/04; B62J 35/00

USPC .......... 296/1.08, 77.1, 78.1, 97.22; 180/219; 220/562

See application file for complete search history.

(56) References Cited

U.S. PATENT DOCUMENTS

| | | | |
|---|---|---|---|
| 4,424,839 A * | 1/1984 | Otani | B60K 15/04 141/326 |
| 5,884,380 A | 3/1999 | Thurm | |
| 6,213,514 B1 | 4/2001 | Natsume et al. | |
| 6,237,710 B1 * | 5/2001 | Mori | B62H 5/00 180/219 |

(Continued)

FOREIGN PATENT DOCUMENTS

| | | |
|---|---|---|
| EP | 0864487 | 9/1998 |
| JP | 61-50885 | 3/1986 |

(Continued)

OTHER PUBLICATIONS

PCT Application No. PCT/JP2013/084039 International Preliminary Report on Patentability dated Jun. 30, 2015, 5 pages.

(Continued)

*Primary Examiner* — Jason S Daniels

(57) ABSTRACT

A fuel tank covering (26) to cover an upper portion of a fuel tank (25) supported by a motorcycle frame structure (FR) covers an intermediate portion of the fuel tank (25) ranging from a front end portion to a rear end portion with respect to a direction widthwise of the motorcycle, and includes a shielding portion (36) configured to cover a mounting area at a front portion where a key cylinder (35) disposed forwardly of the fuel tank (25) is mounted on the motorcycle frame structure (FR).

8 Claims, 9 Drawing Sheets

(56) References Cited

U.S. PATENT DOCUMENTS 8,016,321 B2 9/2011 Shimomura
2009/0166364 A1 7/2009 Shimomura

FOREIGN PATENT DOCUMENTS

| JP | 10-181658 | 7/1998 |
| JP | 10-250664 | 9/1998 |
| JP | 2009-161016 | 7/2009 |
| JP | 2012-076650 | 4/2012 |

OTHER PUBLICATIONS

PCT/JP2013/084039 International Search Report dated Mar. 25, 2014, 1 page.
Extended and Supplementary Search Report Issued Jun. 24, 2016 for Corresponding European Patent Application No. 13867053.4 (6 pages).
Notification of Reason(s) of Rejection Issued Aug. 30, 2016 for Corresponding Japanese Patent Application No. 2012-282409 with English language summary (4 pages).

* cited by examiner

MOTORCYCLE FUEL TANK COVER

CROSS REFERENCE TO THE RELATED APPLICATION

This application is a continuation application, under 35 U.S.C §111(a) of international application No. PCT/JP2013/084039, filed Dec. 19, 2013, which claims priority to Japanese patent application No. 2012-282409, filed Dec. 26, 2012, the entire disclosure of which is herein incorporated by reference as a part of this application.

BACKGROUND OF THE INVENTION

Field of the Invention

The present invention relates to a fuel tank covering for a motorcycle, which is used to cover a portion of an upper portion of the fuel tank to improve the exterior look of such fuel tank.

Description of Related Art

Hitherto, some of the motorcycles currently used make use of a covering to enclose an upper portion of the fuel tank such as disclosed in the patent document 1 listed below. Also, some of the motorcycles similarly now in use make use of a tank covering to enclose a filler cap of the fuel tank such as disclosed in the patent document 2 listed below.

PRIOR ART LITERATURE

Patent Document 1: JP Laid-open Patent Publication No. H10-250664

Patent Document 2: JP Laid-open Patent Publication No. S61-050885

However, since the tank covering disclosed in the patent document 1 referred to above is of a type adapted to cover the entire fuel tank from above, a major portion of the fuel tank excluding the oil filler port is concealed enough to represent a monotonic design which allows only the tank covering to be visible from outside. Accordingly, it lacks a satisfactory sensation in terms of the improvement in exterior look of the fuel tank employed in a motorcycle. It has also been found that the tank covering as a component part is so bulky enough to be poor in handling and storing, and further the cost of materials including the expense required to prepare a die is yet high. In addition, since the cylinder mounting area, where a key cylinder is positioned forwardly of the fuel tank, is not covered by the tank covering, the cylinder mounting area is visible from outside, thereby giving onlookers an impression of disorder and worsening the exterior look around the fuel tank. The fuel tank covering disclosed in the patent document 2 referred to above is of a structure in which only surroundings of the filler cap are covered and the remaining portion of the fuel tank is in no way covered with the tank covering. Therefore, nothing that improves the exterior look has been provided for.

SUMMARY OF THE INVENTION

In view of the foregoing, the present invention has a primary object to provide a fuel tank covering for a motorcycle which is effective to cover only a part of an upper portion of the fuel tank to thereby improve the exterior look of the fuel tank employed in the motorcycle.

In order to accomplish the foregoing object, a fuel tank covering for a motorcycle, in accordance with the present invention, to cover an upper portion of a fuel tank supported by a motorcycle frame structure covers an intermediate portion of the fuel tank with respect to a widthwise direction of the motorcycle, which intermediate portion ranges from a front end portion of the fuel tank to a rear end portion thereof. In such case, the covering includes a shielding portion provided at a front portion thereof and configured to cover a mounting area at which a key cylinder disposed forwardly of the fuel tank is mounted on the motorcycle frame structure. Here, the wording "intermediate region of the fuel tank", means, when viewed from top, a region containing a longitudinal center line of the fuel tank, which lies in a forward and rearward direction or longitudinal direction, and having a width thereof that is ⅔ of a maximum width of the fuel tank or smaller, and preferably, ⅔ of a maximum width or smaller.

According to the present invention, since only the intermediate portion ranging from the front end portion to the rear end portion, which is a part of the upper side of the fuel tank, is covered by the fuel tank covering, an upper surface of the fuel tank is exposed on both sides of the fuel tank covering. Therefore, while the texture and feel peculiar to the fuel tank itself remain retained, the texture and the feel both exhibited by the fuel tank covering can be enhanced and, accordingly, a peculiar exterior look can be presented by a cumulative effect of the fuel tank and the fuel tank covering. When the fuel tank and the fuel tank covering are painted in different colors, the exterior look can be further improved. Also, since the mounting area of the key cylinder onto the motorcycle frame structure are concealed by the shielding portion of the fuel tank covering and is therefore made invisible from the outside, the exterior look in the vicinity of the fuel tank can be improved.

In a preferred embodiment of the present invention, the front portion may have an upright wall extending upwardly from left and right sides and rear of the key cylinder to cover a gap between the fuel tank and the key cylinder. The presence of the upright wall makes it possible to cover both sides of the key cylinder and a rearward gap and, accordingly, the exterior look around the key cylinder improves.

In another preferred embodiment of the present invention, the front portion may be fitted to the fuel tank by means of a fastening member, and a rear portion of the shielding portion is fitted to the motorcycle frame structure at a location rearwardly of the fuel tank. According to the use of the fastening member, since the front portion of the fuel tank covering is fitted to the fuel tank, there is no need to fit the fuel tank covering to the motorcycle frame structure by lengthening such tank covering in a direction forwardly downwardly and, therefore, the fuel tank covering can be shortened. Since a rear portion of the fuel tank covering is fitted to the motorcycle frame structure which has a high rigidity, the fitting becomes firm and robust. Since this mounting seat in the rear portion is concealed by the rider's seat, the exterior look is not impaired.

In a further preferred embodiment of the present invention, the shielding portion referred to above may include a front end engagement member engageable with a front end to-be-engaged member provided in a tank side covering to cover opposite side portions of the fuel tank. The provision of the front end engagement member makes it possible for the shielding portion to be engaged with the tank side covering and, accordingly, an undesirable warp of the shielding portion, which would occur when affected by direct sunlight and/or the outdoor atmosphere, can be avoided.

In a still further preferred embodiment of the present invention, the front end engagement member of the shielding portion may be in the form of a projecting piece, in which case the front end to-be-engaged member of the tank side covering is in the form of a slit-like hole. According to the use of the projecting piece and the slit-like hole for the front end engagement member and the front end to-be-engaged member, respectively, it is possible to conceal the engaged portion to such an extent that they are invisible from the outside, and therefore, the exterior look of the fuel tank will not be impaired.

In a yet further preferred embodiment of the present invention, an intermediate portion of the fuel tank covering with respect to a forward and rearward direction or longitudinal direction may be provided with an intermediate engagement member engageable with an intermediate to-be-engaged member provided in the fuel tank. According to this construction, since the fuel tank covering are engaged not only at the front portion and the rear portion, but also at the intermediate portion with respect to the forward and rearward direction, the mounting of the fuel tank covering becomes firm and robust.

In a still yet further preferred embodiment of the present invention, the fuel tank covering further may include a front portion engagement member engageable with a front portion to-be-engaged member provided in the key cylinder. The provision of the front portion engagement member makes it possible for the fuel tank covering to be engaged not only at the shielding portion, the rear portion and the intermediate portion with respect to the forward and rearward direction but also at the front portion with the front portion to-be-engaged member in the key cylinder, the mounting of the fuel tank covering becomes firm and robust.

In a still yet further preferred embodiment of the present invention, the fuel tank covering may be provided with a cap opening to expose a tank cap to open or close a fuel injection port. This structural feature make it possible for any opening or closing mechanism, necessitated to allow the tank cap to be exposed, to be dispensed with and, therefore, the structure of the fuel tank covering becomes simplified.

In a still yet further preferred embodiment of the present invention, the use of a sealing member interposed may be made between an open edge portion of the cap opening and the fuel tank. According to the use of the sealing member, even though splash of fuel from the inside of the fuel tank takes place during the supply of fuel into the fuel tank through the fuel injection opening, an undesirable leakage of fuel into a gap between the fuel tank and the fuel tank covering can be avoided effectively by such sealing member.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

A preferred embodiment of the present invention will now be described in detail with particular reference to the accompanying drawings. Before the description of the present invention proceeds, it is to be noted that the terms "left" and "right" are used to denote opposite positions or directions, respectively, relative to a motorcycle rider then occupying a motorcycle rider's seat and looking forwards in a direction parallel to the longitudinal sense of the motorcycle.

Figure 1:
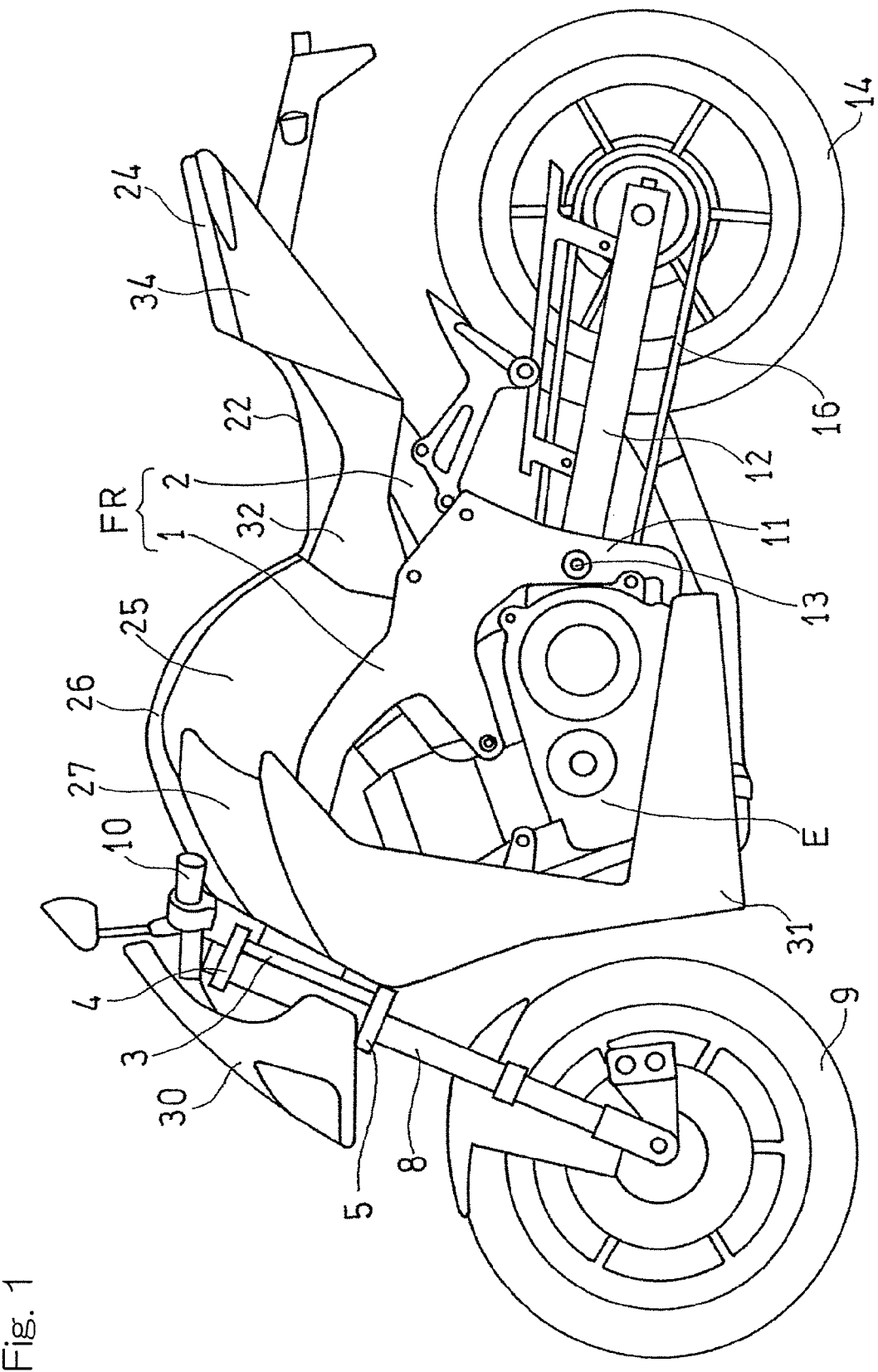
FIG. 1 is a side view of a motorcycle designed in accordance with a preferred embodiment of the present invention.

Referring to FIG. 1 which illustrates a side view of the motorcycle to which the present invention is applied, the illustrated motorcycle includes a main frame assembly 1, forming a front half of a motorcycle frame structure FR, and a rear frame assembly 2 connected with a rear section of the main frame assembly 1 and forming a rear half of the motorcycle frame structure FR. The main frame assembly 1 has a front end to which a head pipe 3 is fitted, and a steering shaft (not shown) is rotatably inserted in this head pipe 3. A top bridge member 4 and a bottom bridge member 5 are fitted to the steering shaft (not shown) and a front fork 8 is supported by those bridge members 4 and 5. The front fork 8 has a lower end portion on which a front wheel 9 is rotatably supported, and a handlebar 10 is fitted to the top bridge member 4 which is positioned on an upper end portion of the front fork 8.

The main frame assembly 1 has a rear end portion provided with a swingarm bracket 11, and a swingarm 12 is supported by the swingarm bracket 11 through a pivot pin 13, which is inserted in the front end portion, for movement up and down. A rear wheel 14 is rotatably supported by a rear portion of the swingarm 12. A motorcycle combustion engine E is supported by a lower intermediate portion of the main frame assembly 1, and this combustion engine E is operable to drive the rear wheel 14 in any known manner through a power transmission mechanism 16 such as, for example a drive chain disposed on a left side of the motorcycle body.

A rider's seat 22 is supported in the rear frame assembly 2, and a fellow passenger's seat 24 is provided rearwardly of the rider's seat 22. A fuel tank 25 made of a metallic material is fitted to an upper section of the main frame assembly 1, that is, to an upper section of the motorcycle body and between the handlebar 10 and the rider's seat 22 by means of a mounting member (not shown). A part of the top of the fuel tank 25 is covered by a fuel tank covering 26 made of a resinous material, and front lateral sides of the fuel tank 25 are covered by respective tank side coverings 27 made of a resinous material. Each of the tank side coverings 27 has a lower edge portion engaged with an upper edge portion of a lower fairing 31 by means of an engagement structure. A portion ranging from an area forwardly of the handlebar 10 to an area laterally of a motorcycle front portion is covered by an upper fairing 30, and laterally side and lower areas of the motorcycle front portion are covered by the lower fairings 31 each made of a resinous material.

A key cylinder 35 is disposed rearwardly of the handlebar 10 and forwardly of the fuel tank 25. Left and right lower areas below the rider's seat 22 are covered by respective motorcycle side coverings 32, and the surrounding of the fellow passenger's seat 24 is covered by a rear seat covering 34 made of a resinous material.

Figure 2:
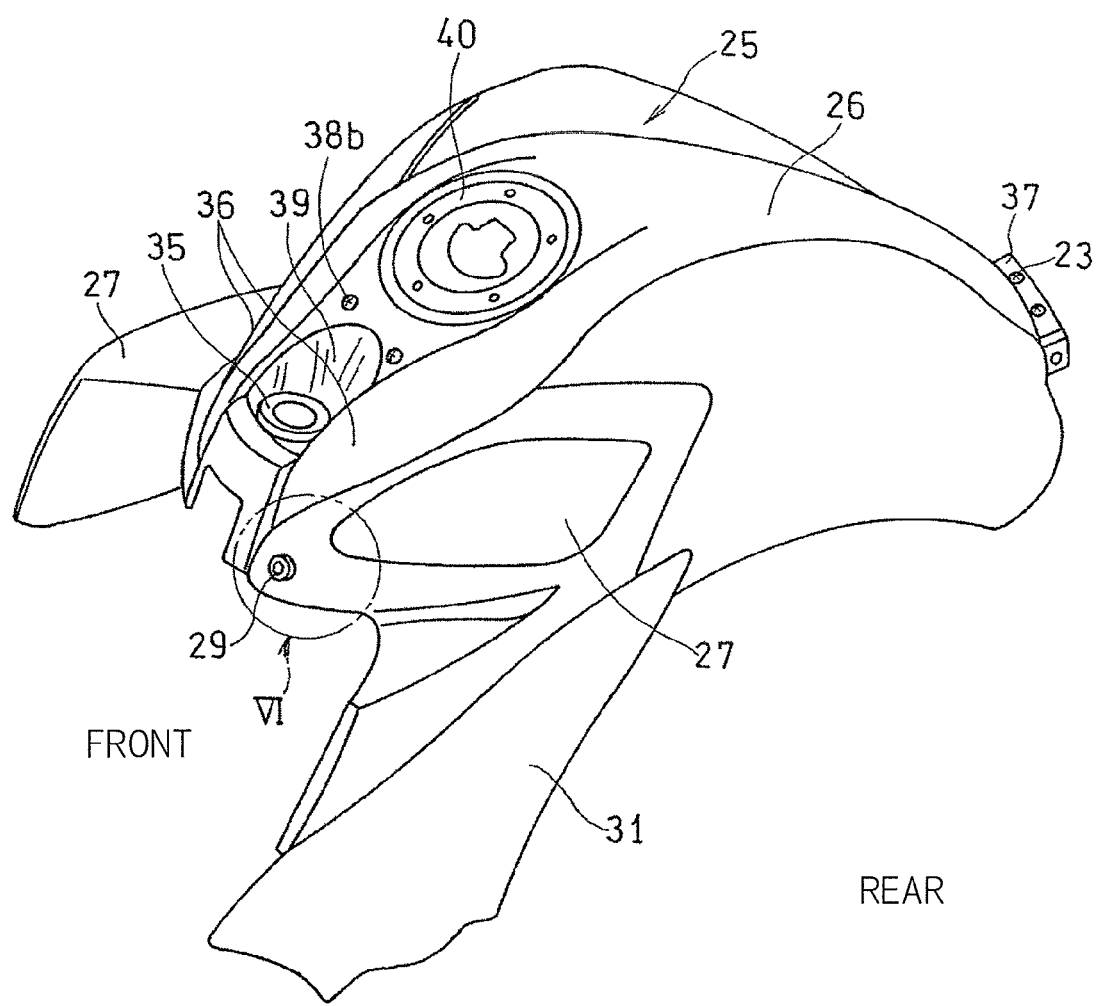
FIG. 2 is a fragmentary perspective view showing, on an enlarged scale, a fuel tank, which is an important portion of the motorcycle, and its neighbor as viewed from diagonally front.
Figure 3:
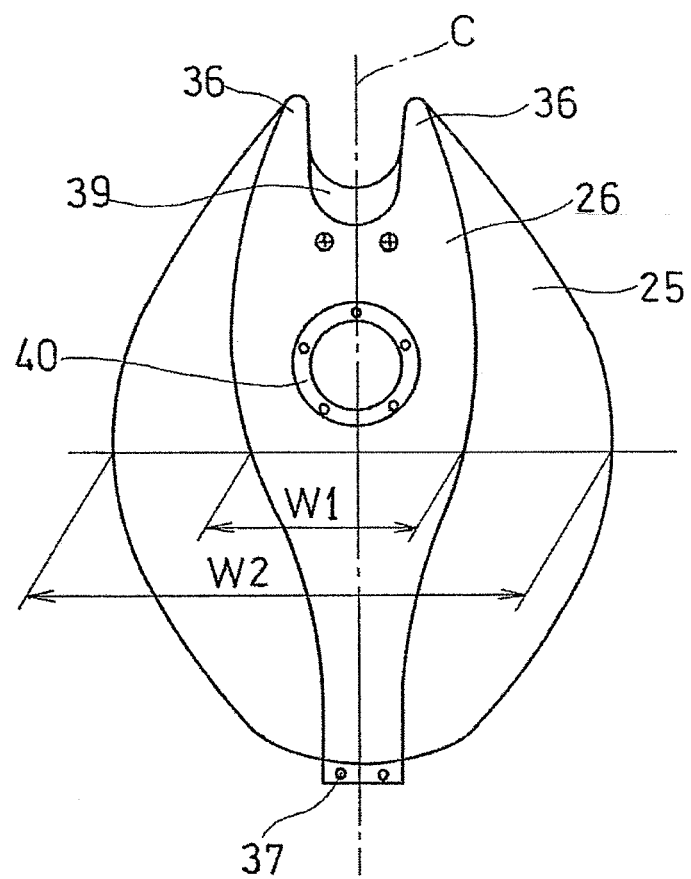
FIG. 3 is a top plan view of the fuel tank.

As best shown in FIG. 2, the fuel tank covering 26 covers an area of the fuel tank 25 ranging from a front end portion thereof to a rear end portion thereof which area lies at an intermediate region with respect to the widthwise direction of the motorcycle. The intermediate region of the fuel tank 25 referred to above means, when viewed from top as best shown in FIG. 3, a region containing a longitudinal center line C of the fuel tank 25, which lies in a forward and rearward direction or longitudinal direction thereof, and having a width thereof, that is, the width W1 of the fuel tank covering 26 that is ⅔ of the maximum width W2 of the fuel tank 25 or smaller and, preferably, ½ of the maximum width W2 or smaller. The fuel tank covering 26 is of a shape symmetrical with respect to the longitudinal center line C and a front portion thereof is provided with left and right shielding portions 36 which cover a mounting area 50 (best shown in FIG. 4) where the key cylinder 35 is mounted on the motorcycle frame structure FR.

Figure 4:
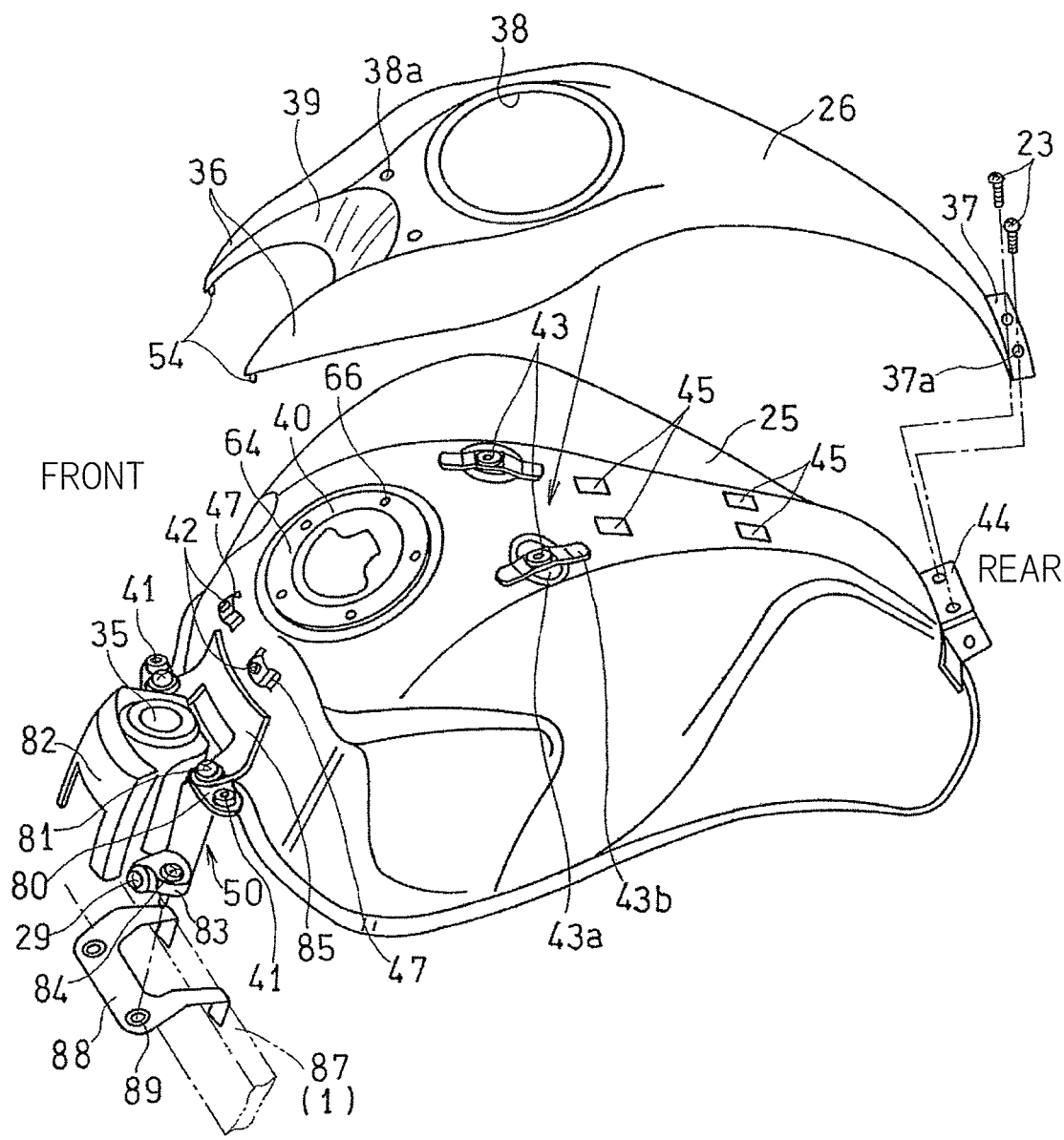
FIG. 4 is an exploded view showing the fuel tank and its neighbor.

With particular reference to FIG. 4, a mounting structure by which the key cylinder 35 at the front portion of the fuel tank 25 is mounted will be described in detail. The key cylinder 35 has a front portion thereof and side portions thereof, which are covered by a key cylinder covering 82 and also has a rear portion to which left and right plate shaped mounting pieces 80 each extending in a leftward and rightward direction are fixed. Those plate shaped mounting pieces 80 are connected with a stay 85, which is fixedly welded to the fuel tank 25, by means of screw bodies 81 to allow the key cylinder 35 to be supported by the fuel tank 25. Also, front portion to-be-engaged members 41, each in the form of a damper engaged with a corresponding front portion engagement member 56 (best shown in FIG. 5), extend through respective mounting pieces 80 and are then fitted to the respective plate shaped mounting pieces 80.

The key cylinder covering 82 has its side portion lower ends formed with respective mounting seats 83. When screw bodies 84 having been passed through those mounting seats 83 are threadingly engaged in respective threaded holes (welded nuts) 89 in a bracket 88 fitted to a cross member 87 of the main frame assembly 1, a lower portion of the key cylinder covering 82 is supported by the main frame assembly 1. In this way, the key cylinder 35 is firmly supported by the fuel tank 25 and the main frame assembly 1. In this case, the front portion to-be-engaged members 41 around the key cylinder 35 and the key cylinder mounting area 50 including the plate shaped mounting pieces 80 and the screw bodies 81 and 84 are covered by the shielding portions 36 and are not therefore exposed to the outside. The mounting seat 83 has a front surface to which front portions of the side tank coverings 27 are fitted by means of bolts 29. Also, the fuel tank covering 26 has a rear portion provided with a rear end mounting member 37, which is fitted to the rear portion of the fuel tank 25 by means of screws, the detail of which will be described later.

As shown in FIG. 4, the fuel tank covering 26 is, when viewed from side, curved upwardly to represent a bow-like shape and includes an upright wall 39 defined at a front portion thereof so as to extend upwardly from left and right sides and rearwardly of the key cylinder 35, to thereby cover a space between the fuel tank 25 and the key cylinder 35. A cap opening 38, through which a tank cap 40 is exposed to the outside, is provided in a covering top at a location rearwardly of the upright wall. Also, front end engagement members (projecting pieces) 54 are formed respectively in the shielding portions 36 of the fuel tank covering 26. In the fuel tank covering 26, insertion holes 38a are formed between the upright wall 39 and the cap opening 38, and the rear end mounting member 37 is formed with left and right screw insertion holes 37a.

Figure 5:
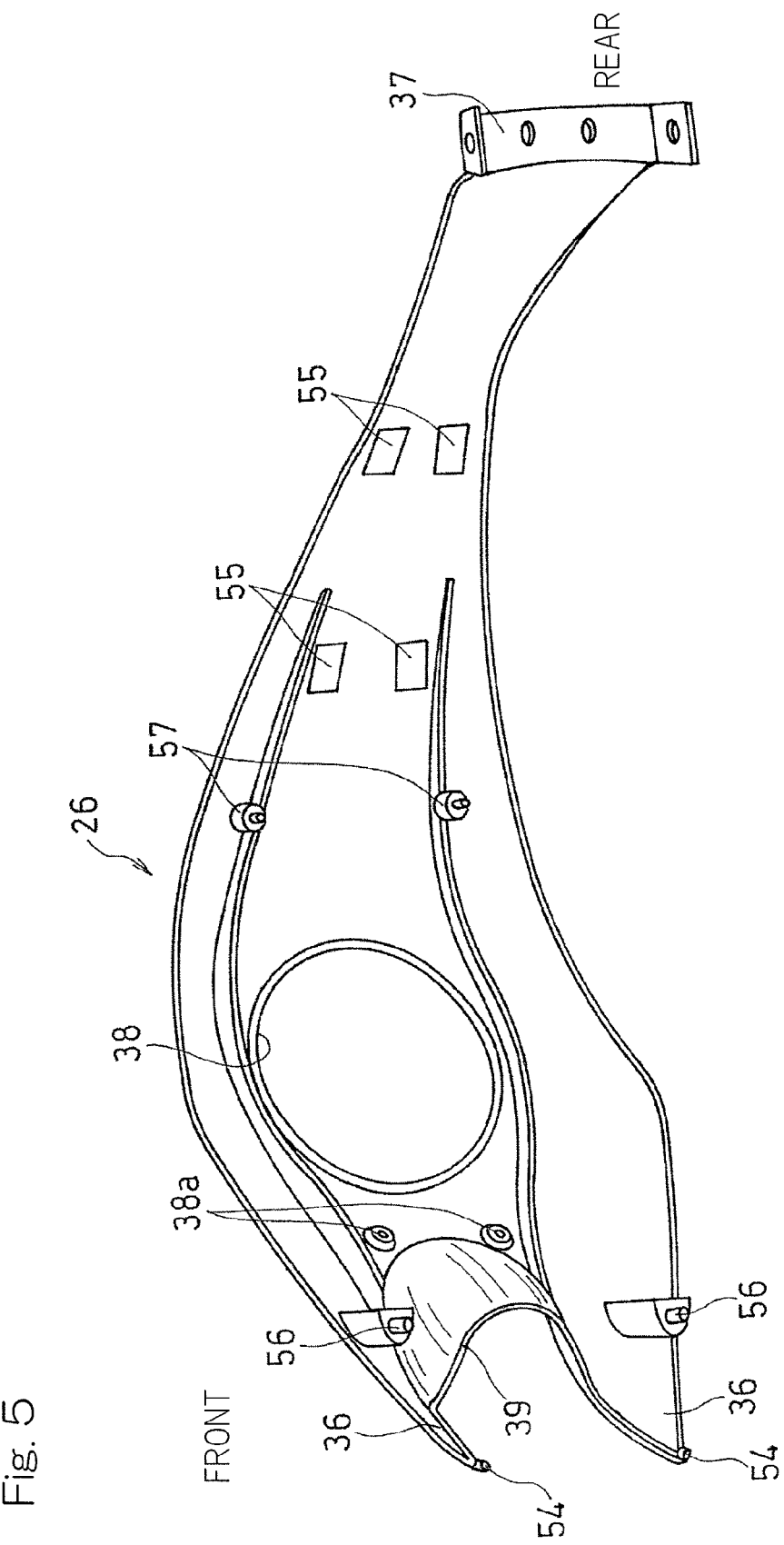
FIG. 5 is a perspective view showing, on a further enlarged scale, a fuel tank covering as viewed from rear.

Also, as shown in FIG. 5, the fuel tank covering 26 has a rear surface provided with the left and right front portion engagement members (projections) 56 and 56, and a longitudinal intermediate portion rearwardly of the cap opening 38 is provided with left and right intermediate engagement members (projections) 57 and 57 each in the form of an engagement projection. Moreover, a plurality of seat fasteners 55, all of which are available having been sold in the market under the trade name of Magic Tape (registered trademark), are provided between the left and right intermediate engagement members 57 and 57 and the rear end mounting member 37 in the rear portion.

As shown in FIG. 4, an intermediate upper surface of the fuel tank 25, ranging from the front end portion to the rear end portion thereof, with respect to the widthwise direction of the motorcycle is provided with, as a locking mechanism for locking the fuel tank covering 26, nuts 42, intermediate to-be-engaged members 43 and a rear end mounting seat 44 sequentially in this order from the front. A plurality of pairs of seat fasteners 45 are pasted between the intermediate to-be-engaged members 43 and the rear end mounting seat 44. The nuts 42 are welded to mounting pieces 47 fixed to the fuel tank 25. Each of the intermediate to-be-engaged members 43 is in the form of an engagement hole formed in a corresponding bridge piece 43b bridging over a recessed area 43a defined in the fuel tank 25.

The front portion engagement member 56 and the intermediate engagement member 57, shown in FIG. 5, are engaged respectively with the front portion to-be-engaged member 41, fitted to the mounting piece 80 shown in FIG. 4, and the intermediate to-be-engaged member 43 in the form of the damper. The seat fasteners 55 and 55 best shown in FIG. 5 are engaged with the respective seat fasteners 45 and 45 best shown in FIG. 4. A screw 38b (best shown in FIG. 2) is inserted into the corresponding screw insertion hole 38a and is then threaded in the nut 42.

Figure 6:
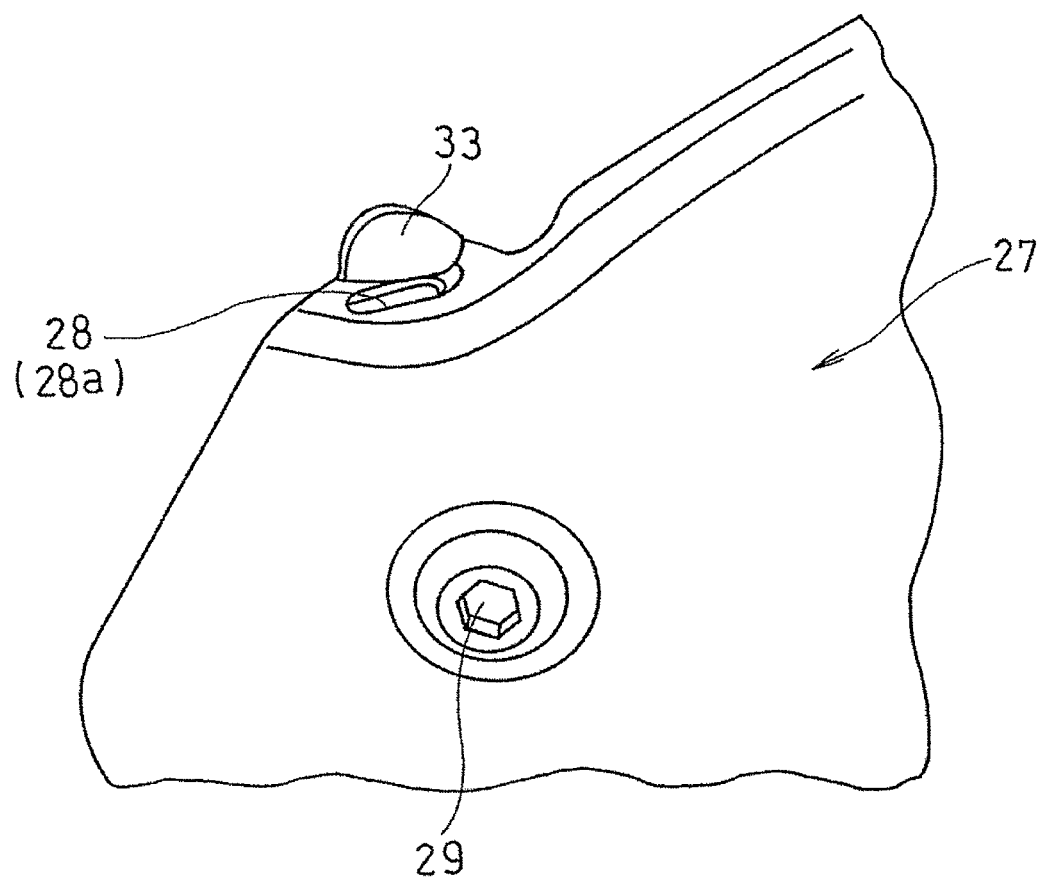
FIG. 6 is a perspective view showing, on a yet further enlarged scale, an encircled portion indicated by VI in FIG. 2.

As shown in FIG. 6, the tank side covering 27 has a front end upper edge portion provided with a front end to-be-engaged member 28 in the form of a slit. A pair of projecting pieces 54 and 54 (best shown in FIG. 5) provided in both side ends of the front end portion of the fuel tank covering 26 are inserted into the front end to-be-engaged member 28 and then engaged with the front end to-be-engaged member 28. An inlet to the front end to-be-engaged member 28 is provided with a guide piece 33 for facilitating the insertion of the pair of the projecting pieces 54 and 54.

Figure 7:
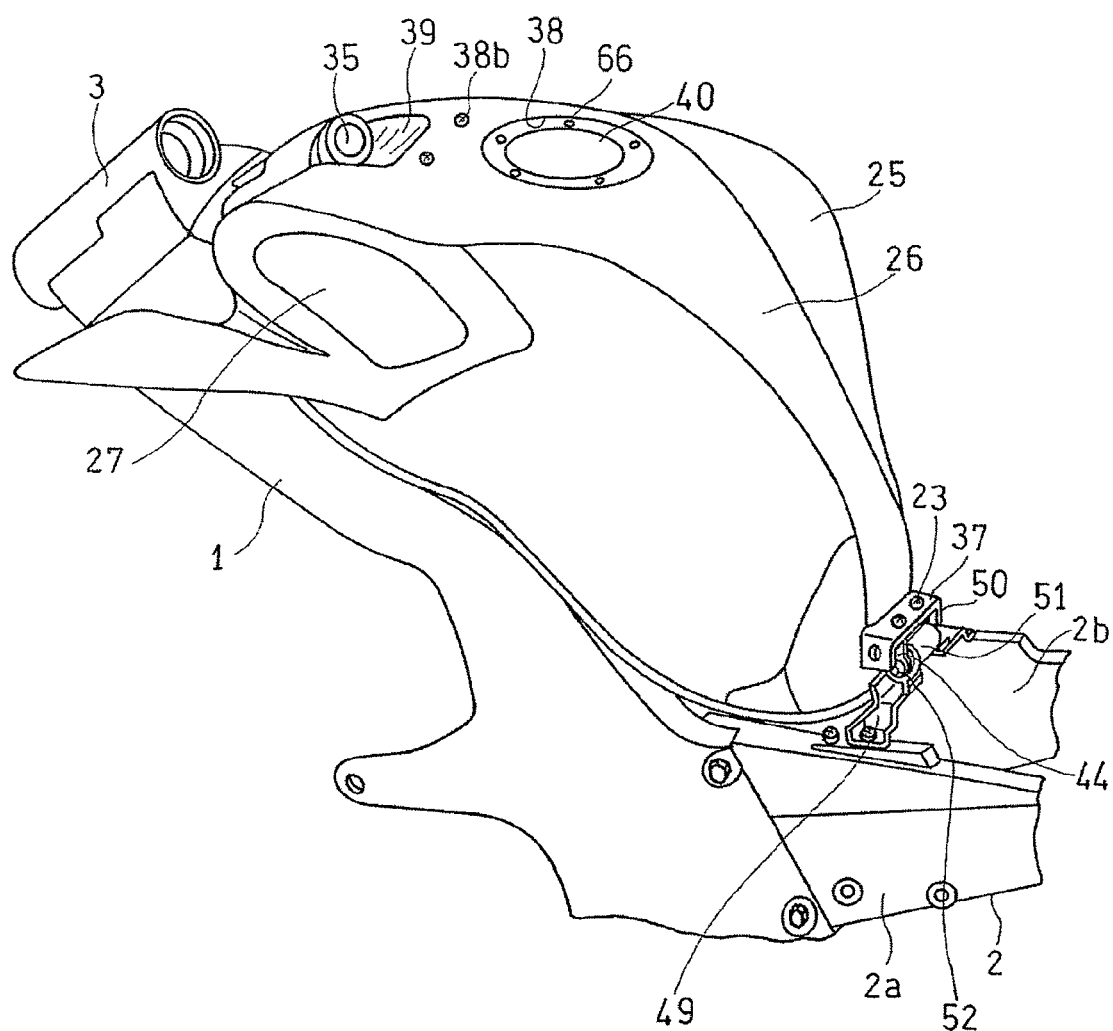
FIG. 7 is a perspective view showing a mounting area between a rear portion of the fuel tank covering and a rear frame as viewed from diagonally rear.

FIG. 7 illustrates a joint between a rear portion of the fuel tank covering 26 and the rear frame assembly 2. As shown in FIG. 7, a support member 49 is threadingly engaged so as to straddle between a pair of seat rails 2a and 2a, which form respective parts of the rear frame assembly 2. A tubular vibration absorbing damper (not shown) is inserted into the inside of a tubular portion 51 provided in the support member 49. The rear end mounting seat 44 of the fuel tank 25 is connected with opposite end portions of the damper by means of a fastening member 52 such as, for example, a bolt. The rear end mounting member 37 of the fuel tank covering 26 is fitted to the rear end mounting seat 44 by means of a fastening member 23 such as, for example, a screw.

Figure 8:
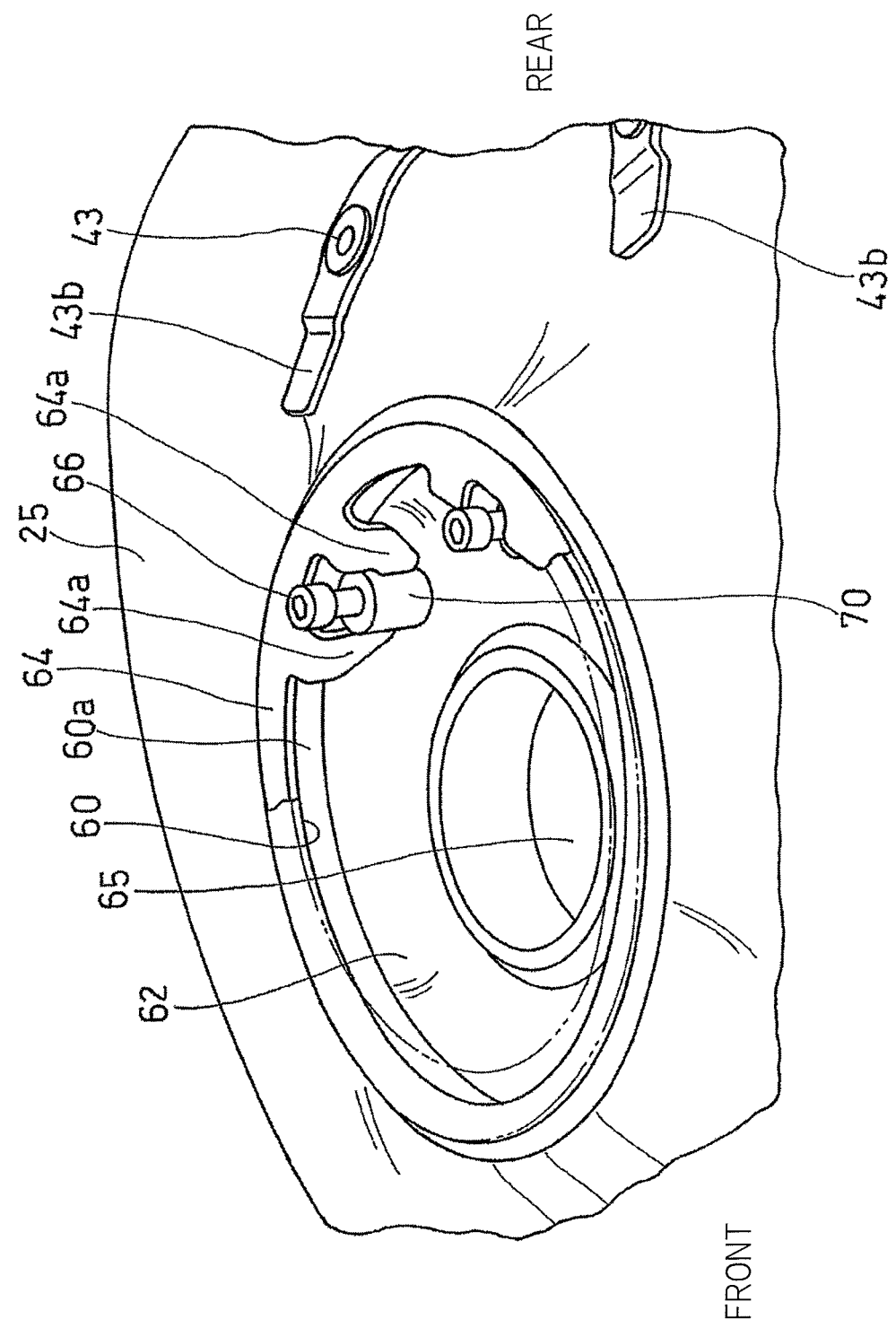
FIG. 8 is a perspective view showing a portion of the fuel tank adjacent a oil filler port.

FIG. 8 is a perspective view showing the vicinity of the oil filler port in the fuel tank 25 while the fuel tank covering 26 is shown removed and, at the same time, the tank cap 40 (best shown in FIG. 2) for opening or closing a fuel injection port 65 is also shown removed. As shown in FIG. 8, a tank opening 60 defined in the fuel tank 25 has a peripheral edge portion 60a defined therein, and a filler 62 is fixed to an inner side of the peripheral edge portion 60a of the tank opening 60 by means of welding. A ring shaped seal retaining member 64 is fitted to the filler 62, referred to above, by means of a plurality of fastening members such as, for example, five bolts 66 and is placed on an upper face of the peripheral edge portion 60a of the tank opening 60. It is, however, to be noted that in FIG. 8, only two of the five bolts 66 are shown.

Figure 9:
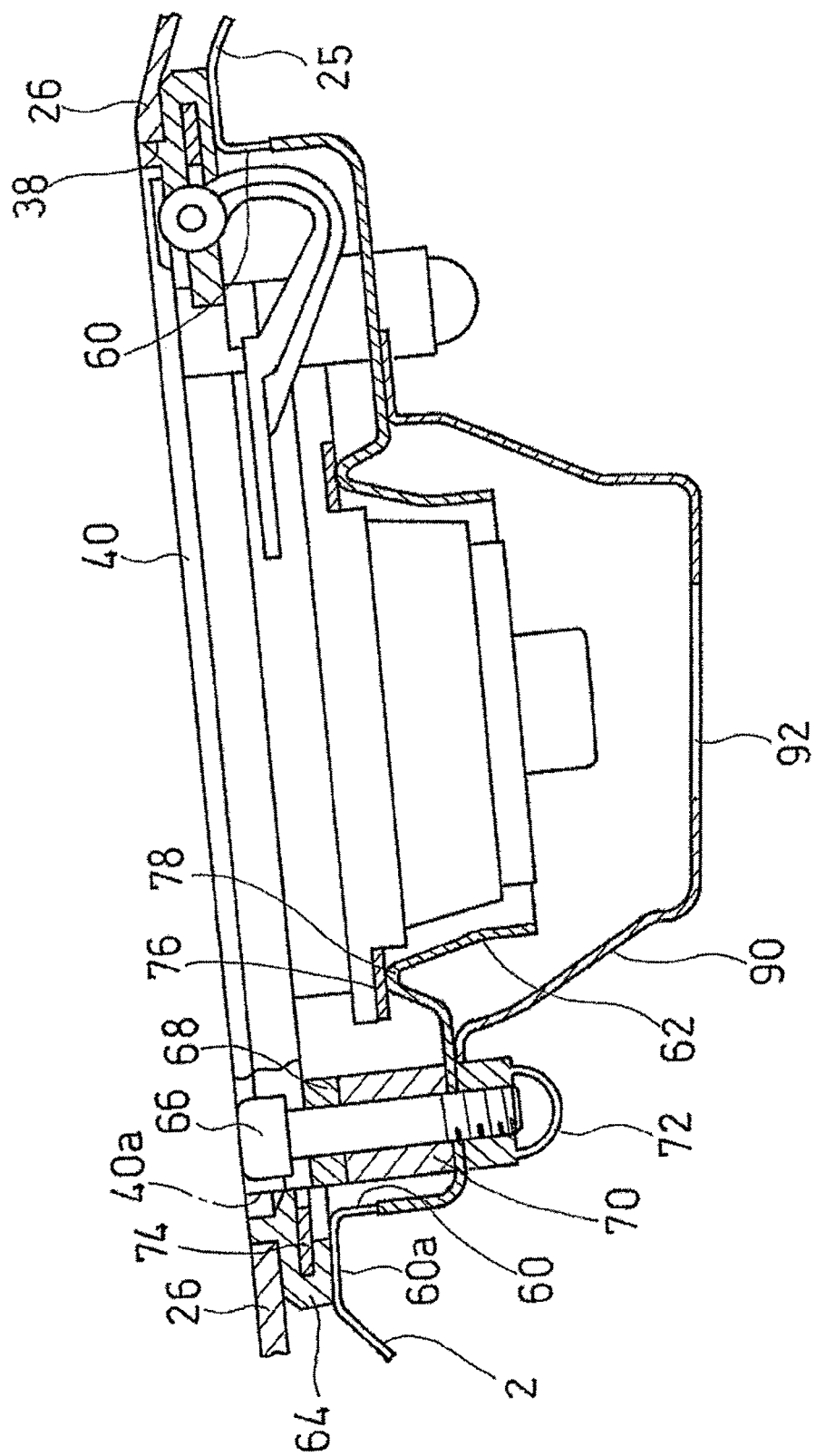
FIG. 9 is a longitudinal sectional view showing that portion of the fuel tank adjacent the oil filler port on an enlarged scale.

As shown in FIG. 9, each of the bolts 66 is, after having been passed through the tank cap 40, a spacer 68 and a collar 70, threadingly engaged with a hexagon cap nut 72 which is fixed to the filler 62 by means of welding, so as to allow it to be fitted to the filler 62. The collar 70 is fixed to a projecting piece 64a of the seal retaining member 64 best shown in FIG. 8 by means of welding, and is placed on the upper face of the filler 62 when the bolt 66 is fitted to the filler 62. In the form as capped by the seal retaining member 64, a sealing member 74 having an anti-oil property (such as, for example, rubber material) is retained, and this sealing member 74 is held in contact with an outer peripheral surface 40a of the tank cap 40, to thereby seal between the tank cap 40 and the cap opening 38 in the fuel tank covering 26 and also between an open edge portion 38a of the cap opening 38 and the peripheral edge portion 60a of the filler 62 on a fuel tank 25 side.

The filler 62 is formed with an annular cap socket 76. When the bolts 66 are fitted accompanied by the tank cap 40 consequently urged against the cap socket 76 through an annular sealing member 78, a gap between the tank cap 40 and the filler 62, that is, a gap between the tank cap 40 and the fuel tank 25 is sealed. The filler 62 has a baffle 90 fitted thereto for avoiding splash of fuel which may occur during the supply of fuel. The baffle 90 is formed with an insertion hole 92 for a fuel supply gun.

In the construction hereinabove fully described, as shown in FIG. 2, only the intermediate portion of the fuel tank 25, which is a part of the upper side of the fuel tank 25, ranging from the front end portion to the rear end portion thereof is covered by the fuel tank covering 26, and therefore, the upper surface of the fuel tank 25 is exposed to opposite sides of the fuel tank covering 26. Accordingly, while the texture and feel peculiar to the fuel tank 25 itself remain retained, the texture and the feel both exhibited by the fuel tank covering 26 can be enhanced and, as a result, a peculiar exterior look can be presented by a cumulative effect of the fuel tank 25 and the fuel tank covering 26. When the fuel tank 25 and the fuel tank covering 26 are painted in different colors, the exterior look can be further improved. Also, since the mounting area of the key cylinder 35 onto the motorcycle frame structure FR are concealed by the shielding portion 36 of the fuel tank covering 26 and is therefore made invisible from the outside, the exterior look or appearance in the vicinity of the fuel tank 25 can improved.

Also, since the front portion of the fuel tank covering 26 has the upright wall 39 extending upwardly from left and right sides and rear of the key cylinder 35 to thereby shield between it and the key cylinder 35, the exterior look around the key cylinder 35 is improved.

Moreover, since the front portion of the fuel tank covering 26 is fitted to the fuel tank 25 by means of the fastening member 38b, there is no need to fit the fuel tank covering 26 to the motorcycle frame structure FR by lengthening such fuel tank covering 26 in a direction forwardly downwardly and, therefore, the fuel tank covering 26 can be shortened. Since a rear portion of the fuel tank covering 26 is fitted to the motorcycle frame structure FR, which has a high rigidity, through the rear end mounting seat 44 (best shown in FIG. 4) of the fuel tank 25 at a location rearwardly of the fuel tank 25 by means of the fastening member 23, the fitting becomes firm and robust. Since this mounting seat in the rear portion is concealed by the rider's seat 22 (best shown in FIG. 1), the exterior look is not impaired.

When the front end engagement members 54 provided in the shielding portion 36 of the fuel tank covering 26 best shown in FIG. 5 is engaged with the front end to-be-engaged member 28 best shown in FIG. 6, the shielding portion 36 best shown in FIG. 5 is connected with the tank side covering 27. Therefore, an undesirable warp of the shielding portion 36, which would occur when affected by direct sunlight and/or the outdoor atmosphere, can be avoided. Also, if the front end engagement member 54 of the shielding portion 36 is rendered to be, for example, a projecting piece and the front end to-be-engaged member 28 shown in FIG. 6 is rendered to be, for example, a hole of a slit shape, an engagement portion is concealed from the outside. Therefore, the exterior look of the fuel tank 25 shown in FIG. 2 will not be impaired.

Also, the intermediate engagement member 57 provided in the longitudinal intermediate portion of the fuel tank covering 26 best shown in FIG. 5 with respect to the forward and rearward direction is engaged with the intermediate to-be-engaged member (damper) 43 provided in the fuel tank 25 shown in FIG. 4. Therefore, the fuel tank covering 26 are engaged not only at the front portion and the rear portion, but also at the intermediate portion with respect to the longitudinal direction, and as a result, the mounting of the fuel tank covering 26 becomes firm and robust.

Yet, since the front portion engagement member 56 of the fuel tank covering 26 as shown in FIG. 5 is engaged with the front portion to-be-engaged member 41 provided in the key cylinder 35 shown in FIG. 4, the fuel tank covering 26 is engaged not only at the shielding portion 36 of the front end, the rear portion and the intermediate portion, but also with the front portion to-be-engaged member 41 of the key cylinder 35, shown in FIG. 4, even at the front portion engagement member 56 shown in FIG. 6. Accordingly, the mounting of the fuel tank covering 26 becomes further firm and robust.

In addition, since the fuel tank covering 26 is provided with the cap opening 38 through which the tank cap 40 is exposed, there is no need to provide the fuel tank covering 26 with an opening or closing mechanism for exposing the tank cap 40 and, therefore, the structure of the fuel tank covering 26 is simplified.

Furthermore, a gap between the open edge portion 38a of the cap opening 38, best shown in FIG. 9, and the peripheral edge portion 60a of the tank opening 60 in the fuel tank 25 side is sealed by the sealing member 74 retained by the seal retaining member 64. Therefore, even though splash of fuel from the inside of the fuel tank 25 takes place during the supply of fuel into the fuel tank 25 through the fuel injection opening 65, an undesirable leakage of fuel into a gap between the fuel tank 25 and the fuel tank covering 26 can be avoided effectively.

Although the preferred embodiment have been fully described with reference to the accompanying drawings, numerous changes and modifications thereof are obvious without departing from the gist of the present invention. Accordingly, such changes and modifications are to be equally understood as included within the scope of the present invention.

While the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 . . . Main frame
2 . . . Rear frame
25 . . . Fuel tank
26 . . . Fuel tank covering
28 . . . Front end to-be-engaged member
35 . . . Key cylinder
36 . . . Shielding portion
37 . . . Rear end mounting member
38 . . . Cap opening
38a . . . Open edge portion
39 . . . Upright wall
40 . . . Tank cap
41 . . . Front portion to-be-engaged member
42 . . . Nut
43 . . . Intermediate to-be-engaged member
44 . . . Rear end mounting seat
50 . . . Key cylinder mounting area
54 . . . Front end engagement member
56 . . . Front portion engagement member
57 . . . Intermediate engagement member
74 . . . Sealing member
FR . . . Motorcycle frame structure

What is claimed is:

1. A covering for a motorcycle to cover an upper portion of a fuel tank supported by a motorcycle frame structure, comprising:
a fuel tank covering covers an intermediate portion of the fuel tank with respect to a widthwise direction of the motorcycle, which intermediate portion ranges from a front end portion of the fuel tank to a rear end portion thereof, and in which the fuel tank covering includes a shielding portion provided at a front portion thereof, wherein
the front portion of the fuel tank covering is fitted to the front end portion of the fuel tank by a fastening member and a rear portion of the fuel tank covering is fitted to the fuel tank at a rearward location, and
the fuel tank covering includes the shielding portion configured to cover a mounting area at which a key cylinder disposed forwardly of the fuel tank is mounted on the motorcycle frame structure, and the shielding portion includes a front end engagement member engageable with a front end to-be engaged member provided in a tank side covering to cover opposite side portions of the fuel tank.

2. The covering for the motorcycle as claimed in claim 1, in which the front portion of the fuel tank covering has an upright wall extending upwardly from left and right sides and rear of the key cylinder to cover a gap between the fuel tank and the key cylinder.

3. The covering for the motorcycle as claimed in claim 1, in which the front end engagement member of the shielding portion is in the form of a projecting piece and the front end to-be-engaged member of the tank side covering is in the form of a slit-like hole.

4. The covering for the motorcycle as claimed in claim 1, in which an intermediate portion of the covering with respect to a forward and rearward direction is provided with an intermediate engagement member engageable with an intermediate to-be-engaged member provided on the fuel tank.

5. The covering for the motorcycle as claimed in claim 1, further comprising a front portion engagement member engageable with a front portion to-be-engaged member provided in the key cylinder.

6. The covering for the motorcycle as claimed in claim 1, in which a cap opening is provided to expose a tank cap to open or close a fuel injection port in the fuel tank.

7. The covering for the motorcycle as claimed in claim 6, further comprising a sealing member interposed between an open edge portion of the cap opening and the fuel tank.

8. The covering for the motorcycle as claimed in claim 7 further including a filler with a baffle for addressing any splash of fuel during filling the fuel tank, the filler is mounted adjacent the sealing member.

* * * * *